United States Patent [19]
Thorud et al.

[11] Patent Number: 5,615,542
[45] Date of Patent: Apr. 1, 1997

[54] MULCHING BLADE FOR LAWN MOWER

[75] Inventors: Richard A. Thorud; Nathan J. Friberg, both of Bloomington, Minn.

[73] Assignee: The Toro Company, Minneapolis, Minn.

[21] Appl. No.: 451,837

[22] Filed: May 30, 1995

[51] Int. Cl.⁶ ................................................ A01D 34/73
[52] U.S. Cl. .......................... 56/255; 56/295; 56/DIG. 17
[58] Field of Search ............................ 56/255, 295, 17.5, 56/DIG. 17, DIG. 20

[56] References Cited

U.S. PATENT DOCUMENTS

| | | |
|---|---|---|
| 2,799,985 | 7/1957 | Rosenberg . |
| 2,854,807 | 10/1958 | Byler et al. . |
| 3,133,398 | 5/1964 | Tatum . |
| 3,343,353 | 9/1967 | Freedlander et al. . |
| 3,343,354 | 9/1967 | Freedlander et al. . |
| 3,343,355 | 9/1967 | Freedlander et al. . |
| 3,445,992 | 5/1969 | Hanson et al. ............... 556/295 |
| 3,541,771 | 11/1970 | Schulze . |
| 3,636,685 | 1/1972 | Speckman . |
| 4,062,171 | 12/1977 | Rose . |
| 4,214,426 | 7/1980 | Lindblad . |
| 4,318,268 | 3/1982 | Szymanis . |
| 4,559,769 | 12/1985 | Seyerle . |
| 5,094,065 | 3/1992 | Azbell ..................... 56/255 |
| 5,148,660 | 9/1992 | Will . |
| 5,327,710 | 7/1994 | Plamper et al. ............ 56/255 |

FOREIGN PATENT DOCUMENTS 2088685 6/1982 United Kingdom ............ 56/295

OTHER PUBLICATIONS

Toro Blade Drawing 75-9420 (Date unknown).

*Primary Examiner*—Terry Lee Melius
*Assistant Examiner*—Heather Shackelford
*Attorney, Agent, or Firm*—James W. Miller

[57] ABSTRACT

A cutting blade for a rotary lawn mower to increase the mulching effectiveness of the mower comprises a generally rectangular blade having a central portion and radially outermost end portions. The blade is curved over its entire length to have a concavely curved upper surface across the width thereof from one end to the other. In addition, the radially outermost end portions of the blade are twisted reversely relative to one another to cause the leading edges thereof to slant downwardly as they extend from the central portion of the blade to the tip portions of the blade.

21 Claims, 4 Drawing Sheets

MULCHING BLADE FOR LAWN MOWER

TECHNICAL FIELD

This invention relates to a cutting blade for a rotary lawn mower which blade is shaped for efficiently hiding or depositing the grass clippings in the cut grass path, namely for enhancing the mulching effectiveness of the lawn mower.

BACKGROUND OF THE INVENTION

Mulching lawn mowers are known which direct the grass clippings severed by the cutting blade downwardly out of the cutting chamber to deposit such clippings in the standing grass remaining in the cut grass path. Various kinds of such mulching mowers are known. For example, mulching mowers are disclosed in U.S. Pat. Nos. 4,205,512 and 4,951,449 to Thorud, both of which are assigned to the assignee of this invention.

The mulching mowers shown in the Thorud patents have grass deflecting members or kickers within the cutting chamber to assist in the downward movement of the grass clippings. These kickers comprise angled grass deflecting surfaces that are fixed in each cutting chamber above the plane of the blade. The grass deflecting surfaces are shaped and positioned to intercept the grass clippings as they circulate inside the cutting chamber to redirect such clippings downwardly. The kickers are spaced apart around the circumference of the cutting chamber.

Other mulching mowers are known in which no kicker members are present in the cutting chamber. Instead, the cutting chamber and blade are specially shaped to effect mulching. For example, U.S. Pat. No. 3,085,386 to Slemmons discloses a mulching mower having a donut-shaped cutting chamber. A specially configured cutting blade allegedly causes the grass clippings to be cut in a radial outer portion of the cutting chamber and to be circulated upwardly and inwardly inside the cutting chamber to eventually be driven downwardly out of the cutting chamber through a radial inner portion of the chamber.

SUMMARY OF THE INVENTION

It is one aspect of this invention to provide a uniquely shaped blade for a rotary lawn mower which provides a good quality of cut and superior mulching as compared to known prior art blades.

One aspect of this invention relates to a lawn mower cutting blade which is suited to be attached to a rotatable drive means for rotating the blade about a generally vertical rotational axis. The blade is generally rectangular having a length that substantially exceeds its width such that the blade is elongated along a longitudinal centerline. The blade is curved across its width extending the length of the blade such that the blade has a concave upper face and a convex lower face. Radially outermost portions of the blade are twisted reversely relative to one another about the longitudinal centerline.

BRIEF DESCRIPTION OF THE DRAWINGS

This invention will be described hereafter in the Detailed Description, taken in conjunction with the following drawings, in which like reference numerals refer to like elements or parts throughout.

FIGS. 5-16 are transverse cross-sectional views of the blade shown in FIG. 1 taken along transverse cross-sectional lines that are spaced apart along the longitudinal centerline of the blade from the center of the blade to one tip thereof, with FIG. 5 being taken along lines 5—5 of FIG. 2, FIG. 6 being taken along lines 6—6 of FIG. 2, and so on.

DETAILED DESCRIPTION

Figure 1:
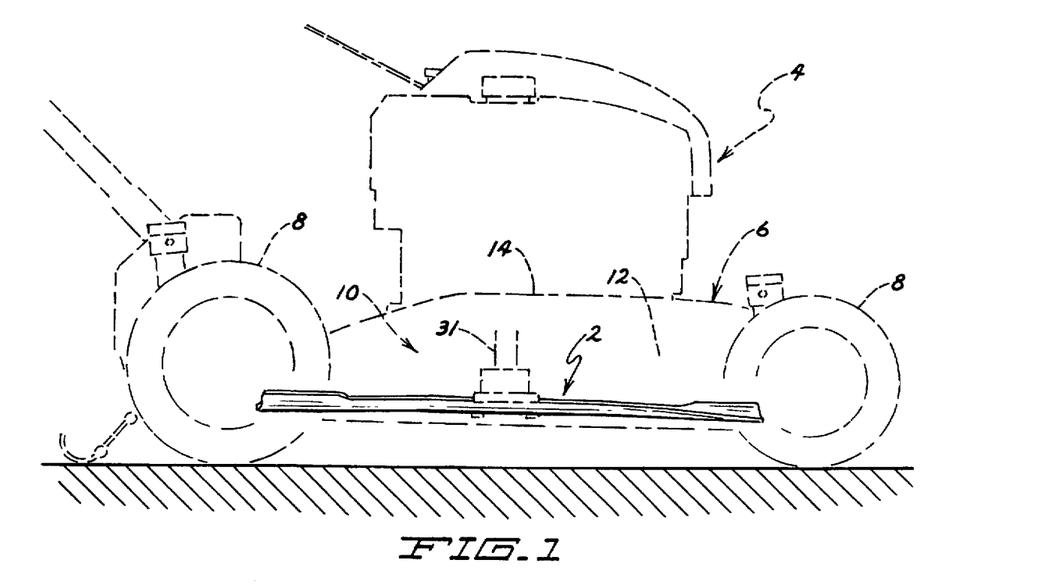
FIG. 1 is a front elevational view of an improved mulching blade according to this invention shown installed on a rotary lawn mower.
Figure 2:
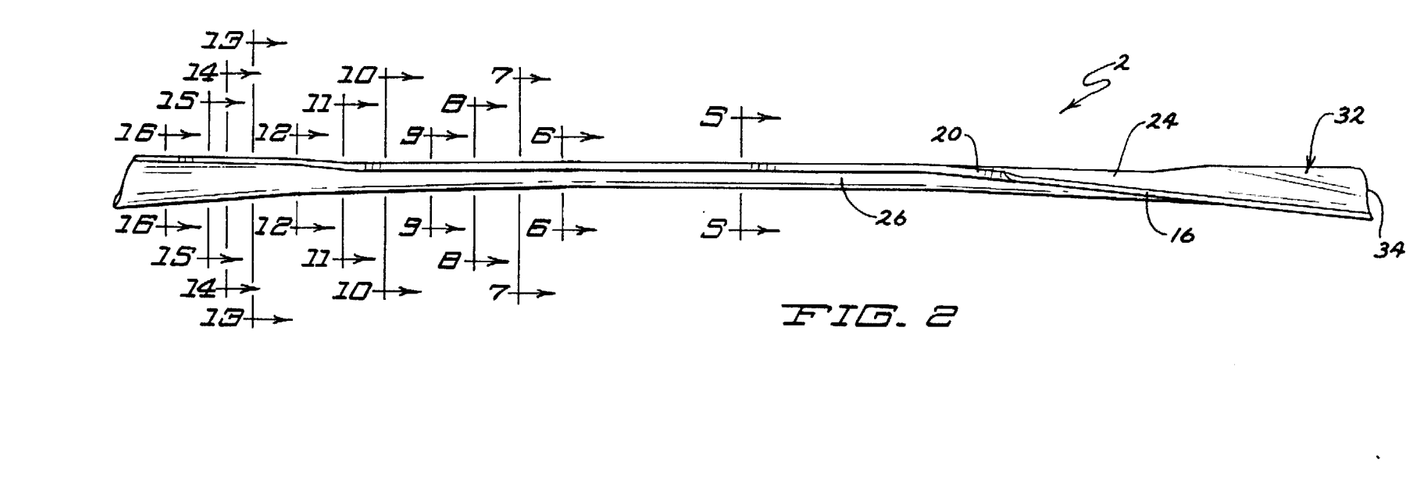
FIG. 2 is a larger front elevational view of the blade shown in FIG. 1.

The improved mulching blade of this invention is generally illustrated in FIG. 1 as 2. Blade 2 is mounted in a mulching lawn mower 4 having a housing or cutting deck 6 supported for movement over the ground in any suitable manner, e.g. by a plurality of ground engaging wheels 8. Deck 6 includes at least one cutting chamber 10 for containing and enclosing rotatable cutting blade 2. Blade 2 is generally horizontal within cutting chamber 10 to rotate in a generally horizontal cutting plane about a generally vertical rotational axis.

A generally circular cutting chamber 10 is provided in deck 6 having a peripheral side wall 12 and a top wall 14 for enclosing blade 2. The bottom side of this cutting chamber is substantially open and faces the ground when lawn mower 4 is placed upright as shown in FIG. 1. Cutting chamber 10 is substantially enclosed to prevent the grass clippings from exiting cutting chamber 10 except through the open bottom side of cutting chamber 10, thus causing mower 2 to be a "mulching mower". In this regard, the term mulching mower is intended to cover mowers which are convertible between a mulching mode and a grass discharge/collection mode in which the grass clippings can exit cutting chamber 10 through a selectively openable grass discharge outlet in side wall 12 or top wall 14, as long as such mower has at least one mode or configuration in which side wall 12 and top wall 14 are substantially enclosed (i.e. the grass discharge outlet is blocked) to cause the clippings to be driven downwardly out of chamber 10 through the open bottom side of the chamber.

The exact details of the lawn mower and cutting chamber 10 are not important to this invention as long as some type of enclosed cutting chamber having a generally open bottom side surrounds and encloses blade 2. This invention relates to a novel and uniquely shaped cutting blade 2 that enhances the mulching effectiveness of such a mower. Thus, in FIG. 1, mower 4 and cutting chamber 10 are diagrammatically shown in phantom so as not to obscure cutting blade 2.

Figure 3:
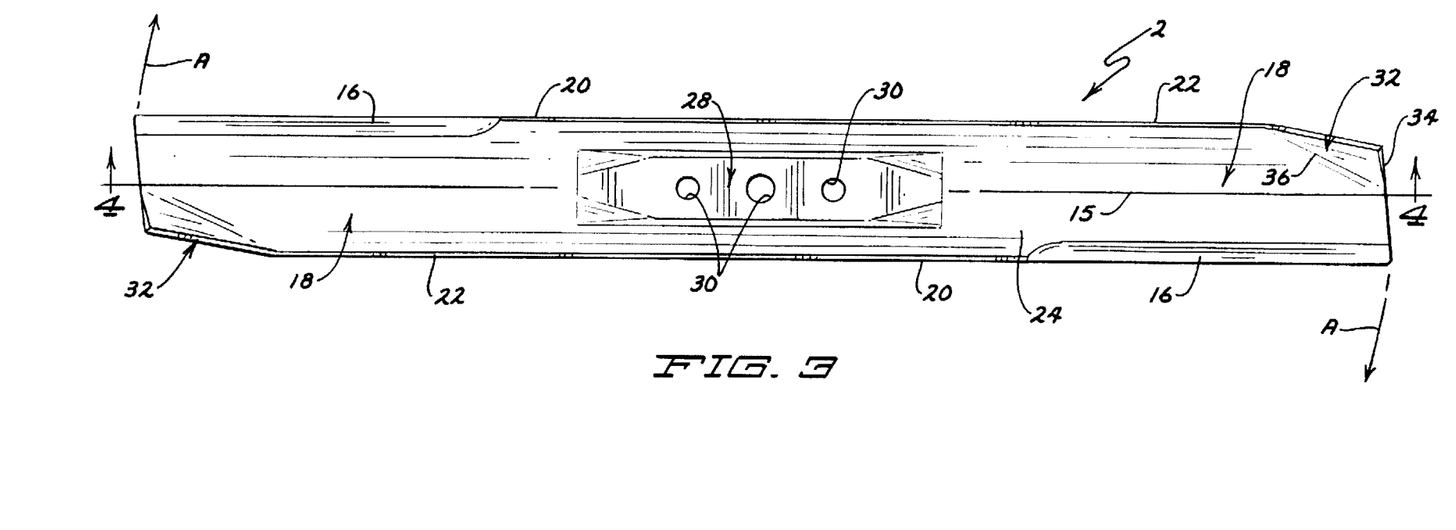
FIG. 3 is a top plan view of the blade shown in FIG. 1.

Referring now to FIG. 3, cutting blade 2 is generally rectangular having a length that substantially exceeds its width such that blade 2 is elongated along a longitudinal centerline 15 located in the upper face 24 of blade 2. Blade 2 is provided with sharpened cutting edges 16 along opposite longitudinal edges of blade 2 and adjacent opposite ends of blade 2. Blade 2 is formed to have generally identical left and right halves 18. Each cutting blade half 18 has a leading edge 20 and a trailing edge 22 spaced apart by the width of blade 2 taken with respect to the normal forward direction of blade 2 as represented by the arrows A in FIG. 3. Each cutting edge 16 of blade 2 is located on the leading edge 20 of one blade half 18. Each cutting edge is approximately 6 inches long in an approximately 20.6 inch long blade as measured along centerline 15.

Figure 6:
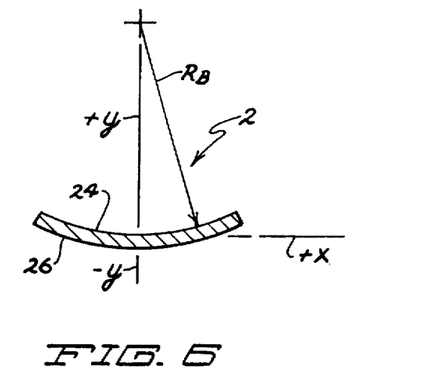

Cutting blade 2 of this invention is generally uniformly curved or cupped across its width extending the length of blade 2. Thus, if one were to orient blade 2 horizontally with the curve facing upwardly as is the case during use of blade 2, blade 2 would have a shallow concave shape along the length thereof when viewed from above and a shallow convex shape when viewed from below. Thus, as shown in FIG. 6, blade 2 has a concave upper face 24 and, correspondingly, a convex lower face 26.

Figure 5:
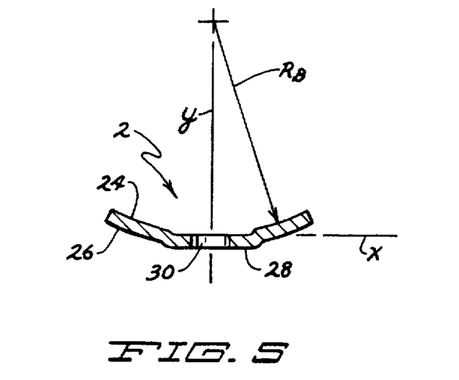

The generally uniform curve occurring across the width of blade 2 has two exceptions. First, a central flattened rib 28 is placed into blade 2 over the central portion of blade 2 with such flat rib 28 having at least one opening 30 through which fastener(s) can pass for attaching blade 2 to the drive shaft 31 of an internal combustion engine or other motor. Thus, as shown in FIG. 5, the curve in blade 2 is interrupted by the flat rib 28 over the length of rib 28. Flat rib 28 is also approximately 6 inches long in an approximately 20.6 inch long blade 2 as measured along centerline 15. However, since the width of rib 28 is preferably less than the width of blade 2, the concave upper face 24 and convex lower face 26 of blade 2 remain on either side of rib 28, i.e. the curve in blade 2 is still present even along the central portion of blade 2 but is just interrupted by the presence of flat rib 28.

While rib 28 is desirably used in blade 2 for more easily securing blade 2 to the drive shaft 31 in many lawn mowers 4, it could be deleted from blade 2 without departing from this invention. In such a case, the generally uniform curve in blade 2 would be undisturbed over the central portion of blade 2.

The second exception to the generally uniform curve in blade 2 involves the formation of a sail 32 at each tip 34 of blade 2 at the trailing edge 22 of each blade half 18. Basically, a triangular section of blade 2 is bent or further curved upwardly relative to concave upper surface 24 along a line 36 which is inclined relative to centerline 15 to form sail 32. Obviously, the smooth, generally uniform curve that previously existed in blade 2 is now disrupted in the area of sail 32. Thus, on each transverse cross-section taken through the width of blade 2 passing through a portion of sail 32, there are now effectively two curved sections, one having a radius rb representing the radius of the concave upper face 24 in blade 2 and the other having a radius rs representing the radius of upper face 24 in sail 32.

If blade 2 were shaped only as described above, the curve in blade 2 would, in effect, form a shallow concave trough over its length. A drop of water placed on any transverse cross-sectional line could not travel along the transverse cross-sectional line and escape from the trough, but rather would tend to flow down the curve of the transverse cross-sectional line to a lowermost point along the line, normally where the transverse cross-sectional line intersects centerline 15.

However, blade 2 of this invention includes one additional design feature. The radially outermost portions of blade 2 on either side of the central portion are twisted about longitudinal centerline 15 so that each blade half 18 also twists forwardly towards its leading edge 20 over such radially outermost portions. Each leading edge 20 is progressively depressed or lowered over the length of the twisted blade portion as one proceeds out towards blade tip 34.

In attempting to visualize the twist imparted in blade 2, imagine taking a uniformly curved blade 2 prior to the twist and holding such blade in front of your body with one hand on each end of the blade near the tip and specifically with your left hand being on that end of the blade in which cutting edge 16 of the blade faces away you and your right hand being on that end of the blade in which cutting edge 16 faces towards you. Then, imagine simply twisting each half of the blade reversely relative to one another about longitudinal centerline 15 of the blade, i.e. you would twist away from your body with your left hand and twist towards your body with your right hand.

The effect of twisting blade 2 in the manner described above is graphically illustrated in FIGS. 5–16 which show a plurality of transverse cross-sectional views spaced apart along longitudinal centerline 15 of the blade from the center of the blade to one tip thereof. An xy coordinate system having its origin placed on the blade centerline is superimposed onto each of these views and is constant. Any deviation in the position of blade 2 in reference to the xy coordinate system is due to the twist in the radially outermost portions of blade 2.

FIG. 5 is a view taken through the center of blade 2 and illustrates flat rib 28 placed into blade 2. FIG. 6 is a view taken through a central portion of blade 2 just immediately past one end of rib 28 and somewhat before sharpened cutting edge 16 begins. Referring to both of these figures, one can see that the twist in blade 2 has not yet begun. Clearly, the center of the radius rb of the blade curvature is still aligned with the y axis of the xy coordinate system with the leading and trailing edges 20, 22 of the blade cross-section being symmetrically located above the x axis.

Figure 7:
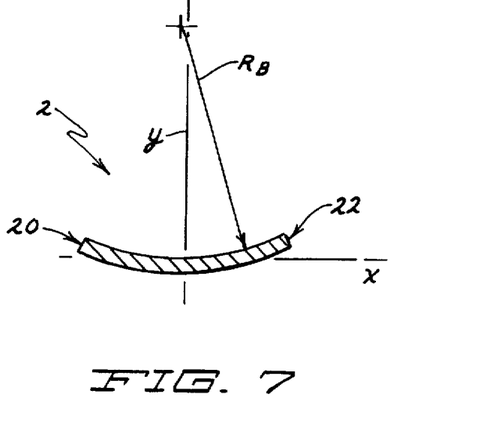

However, at some point past the end of rib 24 slightly beyond the cross-section of FIG. 6 and thus before the beginning of the sharpened cutting edge 16, the twist previously described for blade 2 preferably begins. The first cross-section for which the twist is shown, namely FIG. 7, is somewhat radially inboard of cutting edge 16 with the next cross-section, FIG. 8, being radially aligned with the beginning of cutting edge 16. As the twist begins and progressively takes effect, the center of the radius rb of the blade curvature progressively translates forwardly of the y axis in the −x direction and leading edge 20 of blade half 18 progressively drops down or depresses relative to the x axis in the −y direction. As one proceeds radially out towards tip 34 along longitudinal centerline 15 from one transverse cross-section to the next, one can easily see this progressive translation of these blade reference points relative to the xy axes. For example, referring to FIG. 16, note how far leading edge 20 has dropped along the y axis and how far the center of the radius rb has moved in front of the y axis along the x axis.

A similar translation will also occur for the center of the radius rs of the sail curvature as shown in FIGS. 13–16. Beginning with FIG. 13, which is a cross-section taken at the very beginning of the sail, the sail curvature radius rs will have the its center at a predetermined initial position. As the twist in blade 2 proceeds out towards tip 34, the center of radius rs also moves progressively forwardly in the −x direction from its initial position shown in FIG. 13 to its final position shown in FIG. 16.

Figure 4:
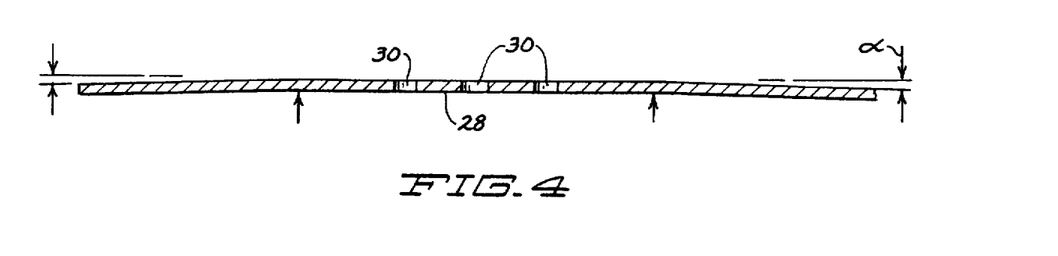
FIG. 4 is a longitudinal cross-sectional view along the longitudinal centerline of the blade taken along lines 4-4 in FIG. 3.

The effect of the blade twist described above is to open up the shallow concave trough formed in blade 2 over the radially outermost twisted portions of the blade with leading edge 20 progressively dropping down relative to trailing edge 22. Thus, to use the earlier example of a drop of water placed along a transverse cross-sectional line, such a drop of water now placed along one of the radially outermost transverse cross-sectional lines will now flow down the line and towards and over leading edge 20 which is now the lowermost point along the line. See FIGS. 14–16. The radially outermost portions of blade 2 which have been twisted are now sloped downwardly relative to the central portion along the longitudinal centerline 15. See the cross-section shown in FIG. 4 and the angle of slope denoted as α.

The distance between the cross-sections taken along lines 5—5 and 6—6 is 3 inches, corresponding to one half of the length of rib 28. The distance between adjacent ones of the cross-sections taken along lines 6—6 through 16—16 is a uniform 0.75 inches, with the exception that the cross-section taken along lines 14—14 is an intermediate cross-section spaced 0.45 inches from the cross-section taken along lines 13—13 and 0.30 inches from the cross-section taken along lines 15—15. Thus, the distance from the cross-section taken along lines 8—8, which is aligned with the start of sharpened cutting edge 16, to the cross-section taken along lines 16—16, which is quite close to tip 34 and near the end of sharpened cutting edge 16, is 5.25 inches.

Figure 8:
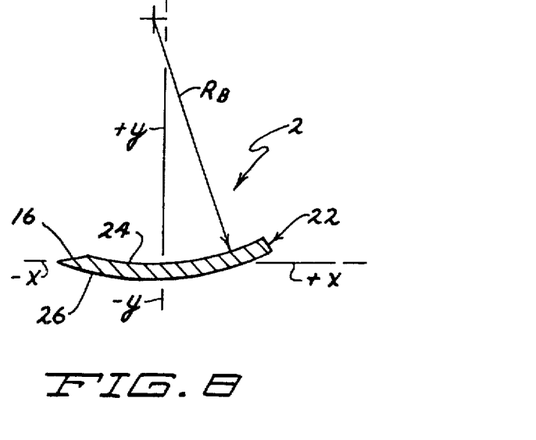
Figure 9:
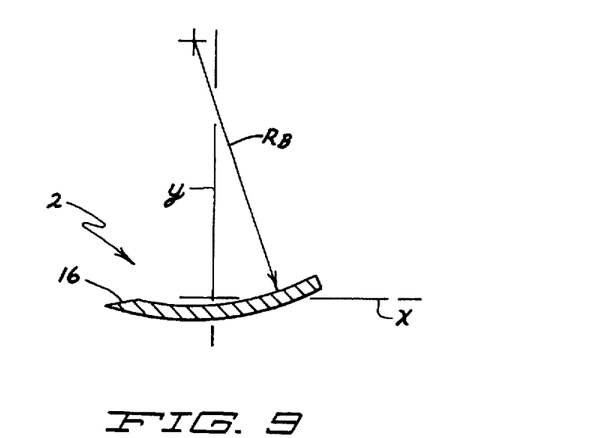
Figure 10:
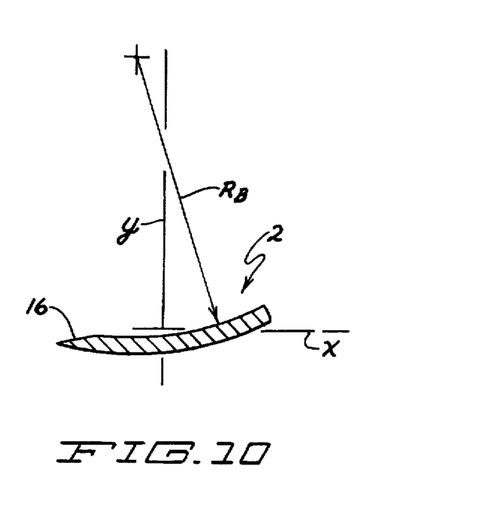
Figure 11:
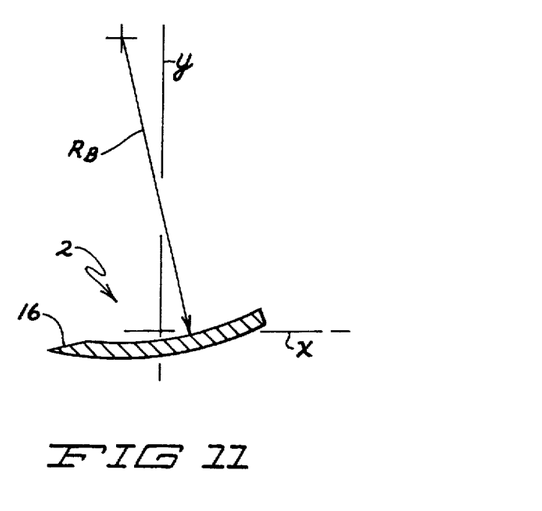
Figure 12:
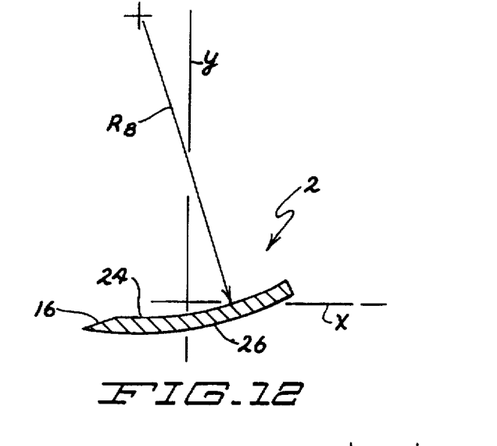
Figure 13:
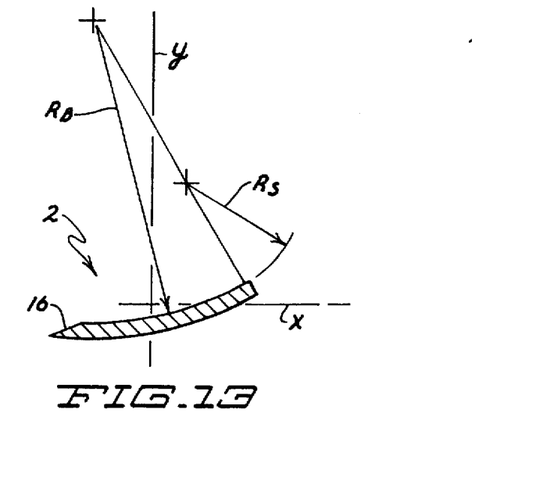
Figure 14:
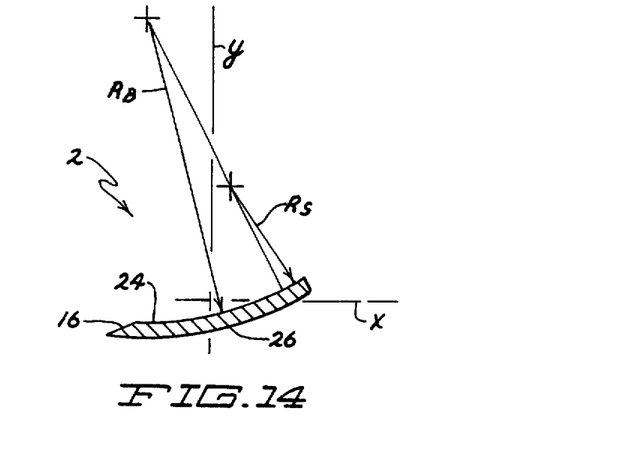
Figure 15:
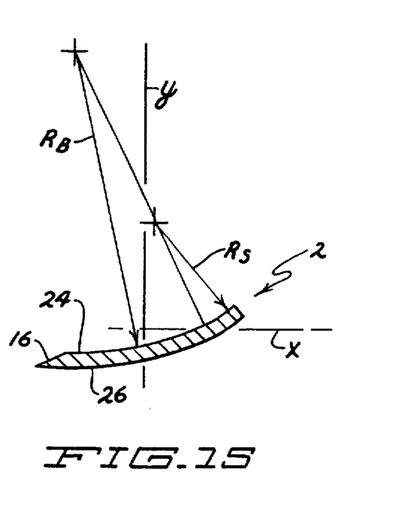
Figure 16:
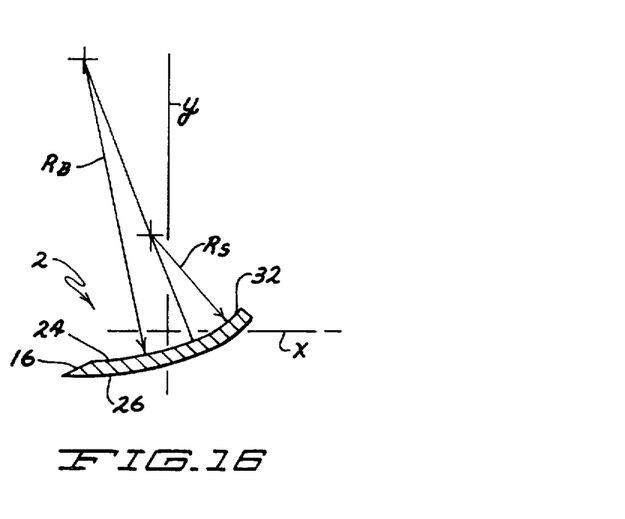

Referring to FIG. 6, one can see that the leading and trailing edges 20 and 22 are vertically aligned with each other before the twist begins. As blade 2 twists and leading edge 20 is depressed relative to the y axis, leading edge 20 will progressively drop below trailing edge 22 to pass through the 0 value of y and eventually reach a −y value while trailing edge 22 will always stay at a slight +y value. The amount of such drop measured along leading edge 20 is 0.461 inches in the 5.25 inches between the cross-sections taken along lines 8—8 and 16—16, respectively, or approximately 0.09 inches of drop for each inch length of twist normally angular along the length of cutting edge 16, i.e. a ratio having a maximum value of approximately 1 to 10 over the twisted blade portion.

Blade 2 can be thought of as being divided approximately into thirds. There is a middle third which forms the central portion of the blade, namely that portion having rib 28, which is not-twisted but is symmetrical about the xy coordinate system. In addition, blade 2 has radially outer thirds having cutting edges 16 extending along a leading edge thereof. The radial outer thirds are twisted about the longitudinal centerline 15 in a manner causing the leading edge on which the sharpened cutting edge is carried to slant uniformly downwardly over the entire length of cutting edge 16. Short connecting sections serve to connect the middle and outer thirds of blade 2, namely those portions of blade 2 between the end of rib 28 and the start of a cutting edge 16.

Blade 2 has been found by the Applicants to have superior mulching ability and a good quality of cut. In tests of blade 2, grass is cut cleanly and evenly and the grass clippings created by blade 2 are well hidden in the cut grass path, even when cutting long, wet grass.

The mulching effectiveness of blade 2 is apparent even when blade 2 is used without other means for enhancing the mulching ability of mower 4. However, blade 2 can also be used in a mower having a plurality of grass deflecting members mounted in cutting chamber 10 as taught by U.S. Pat. No. 4,951,449 to Thorud, which patent is hereby incorporated by reference. Additionally, a set of rotating winglets can be bolted to the underside of blade as taught in U.S. Pat. No. 5,363,635 to White et al., which patent is also hereby incorporated by reference.

Blade 2 is preferably manufactured in any appropriate manner from a rigid metallic material such as steel. For example, blade 2 could be manufactured by first placing the concave curve into a flat blank, by then stamping rib 28 into the blade and by bending sails 32, and by then physically twisting the radially outermost portions of blade 2. Alternatively, blade 2 could be integrally cast or molded from a form having the requisite shape therein.

Various modifications of this invention will be apparent to those skilled in the art. For example, the concave curve in the blade could be absent from the nontwisted central section of the blade while still being present in the radially outermost twisted blade portions. Thus, the scope of this invention is to be limited only by the appended claims.

We claim:

1. A lawn mower cutting blade which is suited to be attached to a rotatable drive means for rotating the blade about a generally vertical rotational axis which comprises:

radially spaced apart outer blade portions located on either side of a central blade portion, wherein each central and outer blade portion includes a leading edge and a trailing edge taken with reference to a forward direction of rotation of the blade, wherein the leading edge of each outer blade portion has at least a portion of a sharpened cutting surface for cutting the vegetation and thereby creating vegetation clippings as the blade rotates in the forward direction of rotation, wherein the central blade portion is concavely curved between its leading and trailing edges when viewed from above over a majority of its width, and wherein each outer blade portion is twisted in a direction from the trailing edge towards the leading edge about a longitudinal centerline of the blade extending from the rotational axis through the outer blade portion in a manner such that a vertical distance between reference points on the leading and trailing edges of the outer blade portion, measured along a transverse cross-sectional line which is perpendicular to the centerline, progressively increases as one moves radially outwardly along the outer blade portion.

2. A cutting blade as recited in claim 1, wherein the central blade portion is also concavely curved between its leading and trailing edges when viewed from above.

3. A cutting blade as recited in claim 2, wherein the degree of concave curvature in the central blade portion is identical to the degree of concave curvature in the outer blade portions.

4. A cutting blade as recited in claim 2, further including a generally flat rib placed into the central portion and extending along the centerline with the rib interrupting the concave curvature of the central blade portion over an area covered by the rib, the rib having openings for the reception of means for fastening the central portion of the blade to the drive means.

5. A cutting blade as recited in claim 1, wherein the outer blade portions each have a sail formed in the trailing edge thereof adjacent a radially outermost tip.

6. A cutting blade as recited in claim 1, wherein the central and outer blade portions are approximately equal in length.

7. A cutting blade as recited in claim 6, wherein the central and outer blade portions are each approximately one third of the blade's total length.

8. A cutting blade as recited in claim 1, wherein the sharpened cutting edge is coextensive with most of the length of the outer blade portion.

9. A lawn mower cutting blade which is suited to be attached to a rotatable drive means for rotating the blade about a generally vertical rotational axis which comprises:

a generally rectangular blade with a leading edge and a trailing edge and having a length that substantially exceeds its width such that the blade is elongated along a longitudinal centerline, wherein the blade is curved across its width such that a radius of blade curvature is defined with the radius being located above the blade, wherein the center of the radius of blade curvature over a central portion of the blade is aligned with a vertical reference plane and the center of the radius of blade curvature over radially outermost portions of the blade is substantially progressively displaced forwardly from the vertical reference place towards a leading edge of the blade.

10. A cutting blade as recited in claim 9, wherein the radially outermost portions of the blade are twisted such that a leading edge of each radially outermost portion is progressively depressed or lowered over the length of the twisted blade portion as one proceeds out towards a blade tip.

11. A cutting blade as recited in claim 10, wherein a sharpened cutting edge is placed over at least a portion of each progressively depressed leading edge.

12. A cutting blade as recited in claim 10, further including an upwardly protruding sail formed adjacent each blade tip along a trailing edge of each radially outermost portion.

13. A lawn mower cutting blade which is suited to be attached to a rotatable drive means for rotating the blade about a generally vertical rotational axis which comprises:

a generally rectangular blade with a leading edge and a trailing edge and having a length that substantially exceeds its width such that the blade is elongated along a longitudinal centerline, wherein the blade includes a central portion having means for attaching the blade to the rotatable drive means and radially outermost portions on either side of the central portion, and wherein the central portion of the blade is symmetrical about the longitudinal centerline and each radially outermost portion of the blade is concavely curved between the leading and trailing edges and is twisted from the leading edge towards the trailing edge relative to the longitudinal centerline in a manner causing a leading edge of each radially outermost portion of the blade on which a sharpened cutting edge is carried to slant substantially uniformly downwardly relative to the longitudinal centerline over substantially the entire length of the cutting edge.

14. A cutting blade as recited in claim 13, wherein the leading edge of each radially outermost portion of the blade drops in a ratio having a maximum value of approximately 1 to 10 over the twisted blade portion.

15. A cutting blade as recited in claim 13, wherein the central portion of the blade comprises approximately a middle one third of the blade with the radially outermost portions of the blade each comprising approximately a remaining one third of the blade length.

16. A cutting blade as recited in claim 13, wherein the entire blade is curved across the width of the blade to define a concave upper surface when viewed from above.

17. An improved mulching rotary lawn mower of the type having at least one cutting chamber in which a cutting blade is contained attached to a rotatable drive means for rotating the blade about a generally vertical rotational axis thereby establishing a generally horizontal cutting plane, wherein the cutting chamber is generally enclosed in a mulching mode thereof to confine the grass clippings being circulated by rotation of the blade until such time as the grass clippings exit the cutting chamber through an open bottom side of the cutting chamber, the improvement relating to the blade and comprising:

a generally rectangular blade with a leading edge and a trailing edge and having a length that substantially exceeds its width such that the blade is elongated along a longitudinal centerline, wherein the blade includes a central portion having means for attaching the blade to the rotatable drive means and radially outermost portions on either side of the central portion, and wherein the central portion of the blade is symmetrical about the longitudinal centerline and each radially outermost portion of the blade is concavely curved between the leading and trailing edges and is twisted from the leading edge towards the trailing edge relative to the longitudinal centerline in a manner causing a leading edge of each radially outermost portion of the blade on which a sharpened cutting edge is carried to slant uniformly downwardly relative to the longitudinal centerline over substantially the entire length of the cutting edge.

18. An improved mulching rotary lawn mower of the type having at least one cutting chamber in which a cutting blade is contained attached to a rotatable drive means for rotating the blade about a generally vertical rotational axis thereby establishing a generally horizontal cutting plane, wherein the cutting chamber is generally enclosed in a mulching mode thereof to confine the grass clippings being circulated by rotation of the blade until such time as the grass clippings exit the cutting chamber through an open bottom side of the cutting chamber, the improvement relating to the blade and comprising:

a blade having radially spaced apart outer blade portions located on either side of a central blade portion, wherein each central and outer blade portion includes a leading edge and a trailing edge taken with reference to a forward direction of rotation of the blade, wherein the leading edge of each outer blade portion has at least a portion of a sharpened cutting surface for cutting the vegetation and thereby creating vegetation clippings as the blade rotates in the forward direction of rotation, wherein the central blade portion is concavely curved between its leading and trailing edges when viewed from above over a majority of its width, and wherein each outer blade portion is twisted in a direction from the trailing edge towards the leading edge about a longitudinal centerline of the blade extending from the rotational axis through the outer blade portion in a manner such that a vertical distance between reference points on the leading and trailing edges of the outer blade portion, measured along a transverse cross-sectional line which is perpendicular to the centerline, progressively increases as one moves radially outwardly along the outer blade portion.

19. An improved mulching rotary lawn mower of the type having at least one cutting chamber in which a cutting blade is contained attached to a rotatable drive means for rotating the blade about a generally vertical rotational axis thereby establishing a generally horizontal cutting plane, wherein the cutting chamber is generally enclosed in a mulching mode thereof to confine the grass clippings being circulated by rotation of the blade until such time as the grass clippings exit the cutting chamber through an open bottom side of the cutting chamber, the improvement relating to the blade and comprising:

a generally rectangular blade having a leading edge and a trailing edge and a length that substantially exceeds its width such that the blade is elongated along a longitudinal centerline, wherein the blade is curved across its width such that a radius of blade curvature is defined with the radius being located above the blade, wherein the center of the radius of blade curvature over a central portion of the blade is aligned with a vertical reference plane and the center of the radius of blade curvature over radially outermost portions of the blade is substantially progressively displaced forwardly from the vertical reference place towards a leading edge of the blade.

20. A cutting blade as recited in claim 19 wherein the longitudinal centerline of the blade is contained within the vertical reference plane.

21. A cutting blade as recited in claim 9, wherein the longitudinal centerline of the blade is contained within the vertical reference plane.

* * * * *

UNITED STATES PATENT AND TRADEMARK OFFICE
CERTIFICATE OF CORRECTION

PATENT NO. : 5,615,542
DATED : April 1, 1997
INVENTOR(S) : Richard A. Thorud et al.

It is certified that error appears in the above-indentified patent and that said Letters Patent is hereby corrected as shown below:

In claim 2, "the central" should read --each outer-- at Column 6, line 38.

Signed and Sealed this

Twenty-ninth Day of July, 1997

Attest:

BRUCE LEHMAN

*Attesting Officer*      *Commissioner of Patents and Trademarks*